United States Patent Office 3,414,651
Patented Dec. 3, 1968

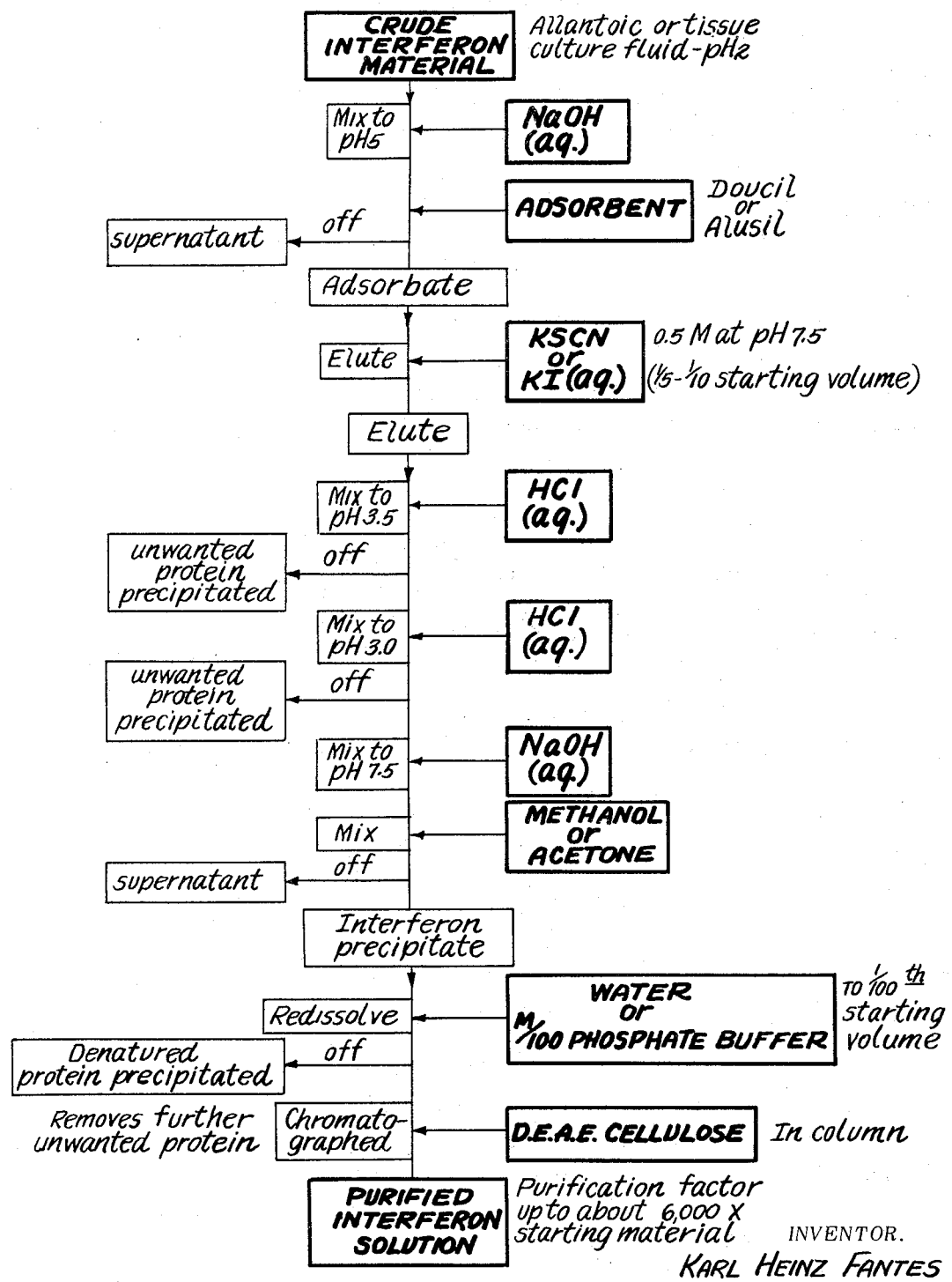

3,414,651
PURIFICATION OF INTERFERON-CONTAINING MATERIAL
Karl Heinz Fantes, Bushey, England, assignor to Glaxo Laboratories Limited, Greenford, England, a British company
Filed Nov. 30, 1964, Ser. No. 414,879
Claims priority, application Great Britain, Dec. 10, 1963, 48,761/63
13 Claims. (Cl. 424—86)

ABSTRACT OF THE DISCLOSURE

A process is provided for the purification of aqueous crude interferon material containing unwanted protein wherein the unwanted protein is precipitated without precipitating interferon by means of a water-soluble salt providing iodide or thiocyanate ions at a pH not greater than 5.0. A preferred procedure is to adsorb the interferon and unwanted protein on an adsorbent, such as Doucil or Alusil, at a pH less than 6.0, elute with an aqueous solution of a salt providing iodide or thiocyanate ions at a pH greater than 5.5, and subsequently adjust the pH of the eluate to below 5.0 to precipitate unwanted protein which is removed. Interferon is precipitated by addition of a water-miscible organic solvent, such as methanol or acetone, the precipitate is redissolved in water or aqueous medium buffered at pH 7.5, discarding any insoluble material. The resulting interferon solution is contacted with an anion exchange resin, such as diethylaminoethyl cellulose, and separated therefrom, whereby further unwanted protein is removed leaving an interferon filtrate having a purification factor up to 6000× the starting material.

---

This invention is concerned with improvements in or relating to the production of the non-specific antiviral substance, interferon.

Interferon is the name given to a non-specific antiviral material which may be obtained from cells and extracellular fluids, and much experimental work has been carried out on this material (D. C. Burke, Biochem., J., 78 (3), 556, 1961; V. Mayer et al., Acta Vir., 5, 130, 1961; J. Porterfield, Lancet, Dec. 9, 1959, 326; R. Pollikoff, Bact. Proc. (61st meeting), 56, 158, 1961; J. Zemla & J. Vlcek, Acta Vir., 5, 129, 1961; A. Isaacs Virus Growth & Variation; (9th Symposium of the Soc. for Gen. Microbiol. Cambridge Univ. Press 1959, p. 102); R. Wagner, Bact. Rev. 24 (1), 151, 1960; Isaacs A. & Lindenmann, J. Proc. Roy. Soc. B., 147, 258, 1957; E. De Mayer & J. F. Enders, Proc. Soc. Exptl. Biol. Med., 107 (3), 573, 1961). When living cells are contacted with living, attenuated or partially inactivated virus they are stimulated to produce such antiviral material which may be liberated into the extracellular fluid and can be isolated in varying degrees of purity. The interferon so produced appears to be generally non-specific in its power to give protection against other viruses in addition to the one which is used to stimulate the cells although differences in sensitivity to interferon are observed between different viruses. However, interferon is usually found to give better protection to tissues and cells of the kind from which it is produced than to other tissues and cells.

The interferon is normally associated with a number of other water-soluble materials, notably proteins, and some degree of purification is preferable if the interferon is to be administered as a medicinal preparation, especially if parenteral administration is envisaged.

It is an object of the present invention to provide an improved process for the purification of material containing interferon.

It has been found that when an aqueous solution containing interferon and also containing protein impurities is treated with a water-soluble thiocyanate or iodide at a pH not greater than 5.0, a large part of the associated protein is precipitated while the interferon remains in solution or is precipitated to a considerably smaller extent, thereby increasing the specific activity of the interferon material.

According to the present invention, therefore, there is provided a process for the purification of material containing interferon wherein unwanted protein is precipitated from an aqueous solution of said material at a pH not greater than 5.0 by means of a water-soluble sale providing iodide or thiocyanate ions, the pH of the solution being adjusted, where required, to a pH not greater than 5.0 before, after or simultaneously with the inclusion of said salt.

The salt furnishing thiocyanate or iodide ions should, of course, be soluble in water and can readily be selected on that basis by reference to solubility tables. In general, however, the alkali metal and ammonium salt and where water-soluble the alkaline earth metal salts are preferred.

The pH of the interferon containing solution is preferably above 2.0, to reduce any tendency to destruction of the product, and the pH is most advantageously in the range 3.0 to 4.0, the most suitable pH being about 3.5. The molarity of the precipitating salt in the solution is preferably at least 0.1 M and advantageously 0.3 M or above. In the case of iodides, the optimal molarity is about 0.7 M. Molarities above about 1.0 M do not appear to be necessary to achieve the desired precipitation although they are not normally otherwise disadvantageous.

As indicated above, the protein precipitation can be effected by adding a thiocyanate or iodide to an aqueous solution of the interferon material at a pH not greater than 5.0 or the iodide or thiocyanate can be added at a higher pH and the pH adjusted subsequently. It may be convenient to adjust the pH in more than one stage to minimize any tendency to coprecipitate interferon. Thus, for example, the pH can be reduced to about 3.5 or 4.0 and then still further to about 3.0.

In British application No. 31,502/62, for which there was filed on Aug. 2, 1963 a corresponding U.S. application Ser. No. 299,463, now U.S. Patent No. 3,265,581, there is described the purification of interferon-containing material by adsorption onto an alumino-silicate at a pH less than 6 and elution by means of an aqueous electrolyte at a pH greater than 5.5 and no greater than 11. The alumino silicate is one having a high molar ratio of silica to alumina, preferably greater than 5. The adsorbent is preferably synthetic amorphous material of small particle size and preferred materials are Doucil and Alusil (sold by J. Crosfield & Sons, Warrington, Lancashire). In British application No. 48,762/63 filed Dec. 10, 1963, for which no corresponding U.S. application was filed, this principle was extended to the use of silica, preferably precipitated or sublimed silica as adsorbent, preferred materials being Neosyl (J. Crosfield) and Aerosil B.P.

The preferred eluant in this previous process is an aqueous solution of a salt such as an alkali metal phosphate at a pH of about 7–8 and a molarity of 0.1 to 0.7 M. It has now been found that the thiocyanate or iodide used as precipitant can be used as the electrolyte in the eluant and since the eluting pH must be greater than 5.5 and is normally about 7.5, substantially no protein precipitation occurs during elution. If, however, the pH of the eluate is adjusted to 5.0 or below, for example about 3.5, by addition of acid, the protein impurities precipitate and may be removed.

The overall process of adsorption, elution with thiocyanate and protein precipitation is especially effective and it has been possible to increase the specific activity in this way by about 19 times with five-fold concentration. This process is illustrated by the accompanying flow sheet.

After precipitation, the unwanted protein is removed from solution, e.g. by filtration or centrifugation. The resulting aqueous solution may then, if desired, be subjected to other process stages such as precipitation of the interferon and removal of further impurities.

The interferon can be recovered from aqueous solution by, for example, precipitation. Water-miscible alcohols and ketones such as methanol, ethanol, acetone etc. are especially useful precipitants since they may be removed readily from the precipitate e.g. by evaporation whereas solid precipitants such as ammonium sulphate etc. normally require subsequent dialysis. Precipitation with such organic solvents is preferably effected in the pH range 6–9, advantageously about 7.5. On re-dissolving such a precipitate in water or a buffer solution, e.g. Earl's buffer, some of the unwanted protein is found to be denatured and insoluble, thereby again increasing the specific activity of the interferon material.

A further useful purification step is treatment of the final interferon solution with an anion exchange resin such as diethylaminoethyl cellulose, whereby further inactive protein is removed while the interferon remains substantially unaffected.

As shown by the drawing, a flow diagram, the most preferred sequence of operations according to the invention is:

(a) Adsorption of the interferon material onto an adsorbent such as Doucil or Alusil at acid pH.

(b) Elution of the interferon with an aqueous solution of a thiocyanate or iodide at a higher pH (above 5.5).

(c) Acidification to bring the pH of the eluate to below 5.0, preferably to about 3.0, the most advantageous method being acidification to pH 3.5, removal of precipitate, further acidification to pH 3.0 and further removal of precipitate.

(d) Adjustment of the resulting interferon solution to a higher pH, e.g. 6–9, preferably about 7.5, and precipitation of interferon with a water-miscible solvent such as methanol, ethanol or acetone, followed by redissolving in a smaller volume of water or dilute buffer and removal of denatured protein.

(e) Chromatography of the interferon solution with an anion exchange resin such as DEAE cellulose whereby some further protein is removed.

It has been found that such a sequence of stages can increase the specific activity of the interferon by as many as 6000 times and each stage is suitable for industrial scale operation, avoidance of dialysis being an especially useful feature in this connection.

The process according to the invention can be applied in the production of interferon from any type of cell stimulated by virus, for example, avian cells such as egg chorioallantoic membrane cells or whole chick embryos stimulated by influenza virus, Newcastle disease, fowl plague, etc., or mammalian cells such as monkey kidney, human amnion cells or even cell-lines infected with these and other viruses. The culture of such living materials and the optimum conditions required are well known in the art (Ho.M. & Enders J. F. Proc. Nat. Acad. Sci. 45, 385, 1959 (human kidney cells); Isaacs A. & Hitchcock C. Lancet 9.7, 1960, p. 9 (lungs from infected mice); De Mayer E. & Enders J. F., Proc Soc. Exptl. Biol. Med. 107 (3), 573, 1961 (human amnion cells)).

The process may be applied at any convenient stage in the purification of the interferon. Thus one may directly subject a virus/cell culture medium to the process according to the invention, preferably after removal of tissues or cell debris, to achieve a purification of the interferon. One may also apply the process according to the invention, to the interferon containing liquid which has been partly purified by other means e.g. selective precipitation of protein, for example, with ammonium sulphate, dialysis etc. whereby further purification of the interferon may be achieved.

In order that the invention may be well understood the following examples are given by way of illustration only.

SOURCE OF INTERFERON (a) Chick interferon.—9–11 day old chick embryos are inoculated allantoically with a suitable dilution of an influenza virus (e.g. B/England, A/Melbourne, A/Singapore or Kunz; usually 0.5 ml. containing 100–500 HA units). The eggs are then incubated at 37° for 48–72 hours, and then placed in a cold room to cool. The allantoic fluid is harvested and dialysed against pH 2.0 citrate buffer or acidified to pH 2 (with, for example, hydrochloric acid) and kept at 4° C. for about 16–24 hours. (This kills the virus and also destroys its haemaglutinating activity without affecting the interferon titre). The fluid is then neutralised to pH 7.0–7.4 by adding N-NaOH or by dialysis against an appropriate buffer, and then served as the starting material for the experimental work. It is referred to herein as "crude interferon." The ionic concentration of the solution is approximately isotonic.

(b) Monkey interferon.—The culture fluid of a 7–10 day old monolayer of cyanomolgus monkey kidney cells (in a Roux Bottle) is changed for 100 ml. Parker's 199 medium containing a little additional $NaHCO_3$ (approx. 0.1%). This is then infected with 1 ml. Kunz virus (approx. 4000 HA units); the cultures are then incubated at 37° for three days. The culture fluid which contains the interferon is then harvested, adjusted to pH 2 with HCl to kill the virus and reneutralised after 3–16 hours. The ionic concentration of the solution is approximately isotonic.

Interferon assay.—A plaque reduction assay according to the method of Isaacs et al., Lancet, 9.7.60 p. 69 was used. For chick interferon, chick embryo monolayers and Semliki Forest Virus were used; for monkey interferon, monkey kidney cells and M6 virus were used. For monkey kidney and chick interferon assay, a tube assay was sometimes used, the dilution of a sample which protected 50% of the cells from viral attack being a measure of the interferon content.

Protein assay.— The method of Lowry et al. (J. Biol. Chem. 193, 265, 1951) was used.

Example 1

In an exploratory experiment solid KSCN was added to crude chick interferon solution prepared as in (b) above to give concentrations of 0.4, 1.0 and 2.0 molar. Portions of these fluids were adjusted to pH 3.0, 3.5, 4.0 and 4.5 with HCl and then allowed to stand for 16 hours at 4°. Precipitated protein was removed by spinning. Interferon and total protein contents of the starting fluid and of the resulting KSCN supernatants (after neutralisation and dialysis against Earle's buffer) were ascertained and are shown in table I.

TABLE I

| | Percent of plaque reduction caused by dilution of interferon | | | Protein | |
|---|---|---|---|---|---|
| | 1/3 | 1/6 | 1/12 | µg./ml. | Percent |
| Starting fluid | 71 | 60 | 0 | 1,530 | 100 |
| KSCN-supernatant | | | | | |

| Molarity | pH | | | | |
|---|---|---|---|---|---|
| 0.4 | ⎫ | 50 | 43 | 29 | 470 | 31 |
| 1.0 | ⎬ 3.0 | 62 | 52 | 40 | 210 | 14 |
| 2.0 | ⎭ | 63 | 49 | 32 | 140 | 9 |
| 0.4 | ⎫ | 72 | 53 | 37 | 500 | 33 |
| 1.0 | ⎬ 3.5 | 61 | 50 | 25 | 470 | 31 |
| 2.0 | ⎭ | 53 | 45 | 39 | 210 | 14 |
| 0.4 | ⎫ | 86 | 62 | 31 | 890 | 58 |
| 1.0 | ⎬ 4.0 | 62 | 43 | 28 | 770 | 50 |
| 2.0 | ⎭ | 57 | 48 | 31 | 780 | 51 |
| 0.4 | ⎫ | 98 | 73 | 43 | 1,140 | 75 |
| 1.0 | ⎬ 4.5 | 81 | 69 | 35 | 1,100 | 72 |
| 2.0 | ⎭ | 59 | 43 | 25 | 1,050 | 69 |

The results show that most or all of the activity stayed in the supernatant, whilst inactive protein was removed by precipitation.

More protein was precipitated at lower pH's and at higher KSCN concentrations. At pH 4 only 40–50% and at pH 4.5 only 25–30% of inert protein was removed. At pH 3, and with high KSCN concentration also at pH 3.5, some activity was probably lost by co-precipitation (but the re-suspended precipitates did not possess any activity).

Example 2

In a second experiment crude interferon was treated with 0.4 M KSCN at pH 3.5 under conditions similar to those of Example 1. Interferon activity was however measured differently, i.e. by finding the dilution which inhibited 50% of the cytopathic effect caused by Semliki Forest virus on chick fibroblast cell sheets. Results are in table II.

TABLE II

| | Interferon | | Protein | |
|---|---|---|---|---|
| | Titre | Percent | µg./ml. | Percent |
| Starting fluid | 1/120 | 100 | 1,060 | 100 |
| KSCN supernatant | 1/120 | 100 | 230 | 22 |

The supernatant contained all the activity, but only 22% of the original protein, i.e. the interferon was purified 5× without any loss.

Example 3

The effect of various concentrations of KI at pH 3.3 on interferon and total protein was compared with that of 0.5 M KSCN at the same pH. Experimental conditions were similar to those in "Example 2." Results are in table III.

TABLE III

| | Interferon | | Protein | |
|---|---|---|---|---|
| | Titre | Percent | µg./ml. | Percent |
| Starting fluid | 80 | 100 | 1,400 | 100 |
| pH 3.3 supernatant from: | | | | |
| KI, 0.4 M | 40 | 50 | 430 | 31 |
| KI, 0.6 M | 40 | 50 | 360 | 26 |
| KI, 0.8 M | 40 | 50 | 300 | 22 |
| KI, 1.0 M | 40 | 50 | 280 | 20 |
| KSCN 0.5 M | 40 | 50 | 280 | 20 |

The effect of KI was similar to that of KSCN, though somewhat higher molar concentrations of KI were perhaps necessary.

KCl and KBr, 0.4–1.0 M, at pH 3.3 precipitated only little inert protein.

Example 4

It was shown in U.S. Patent No. 3,265,581 that interferon could be absorbed by certain aluminum-silicates and re-eluted under suitable conditions by smaller volumes of salt solutions, thus achieving concentration and purification.

In this example interferon was adsorbed by 4 mg./ml. of the alumino-silicate "doucil" at pH 5, and portions were eluted with 0.4, 0.6 and 0.8 M solutions of KSCN at pH 7.5, using in each case a volume which was ⅕ that of the starting fluid. Samples of the eluates were assayed for interferon and protein, the remainders were adjusted to pH 3.5 and supernatants thereof were again assayed. Results are in Table IV.

TABLE IV

| | Volume, ml. | Interferon | | Protein | |
|---|---|---|---|---|---|
| | | Titre | Percent | µg./ml. | Percent |
| Starting fluids | 40 | 80 | 100 | 1,310 | 100 |
| 0.4 M eluate | 8 | 300 | 75 | 2,230 | 34 |
| 0.6 M eluate | 8 | 200 | 50 | 2,350 | 36 |
| 0.8 M eluate | 8 | 300 | 75 | 2,340 | 36 |
| 0.4 M pH 3.5 supernatant | 8 | 200 | 50 | 180 | 2.7 |
| 0.6 M pH 3.5 supernatant | 8 | 200 | 50 | 170 | 2.6 |
| 0.8 M pH 3.5 supernatant | 8 | 200 | 50 | 180 | 2.7 |

This experiment showed that 0.4–0.8 M KSCN eluted interferon in 50–75% yield from a doucil adsorbate, producing 5 fold concentrates by volume with some purification. Acidification of the eluates to pH 3.5 gave rise to further marked purification. Thus, five fold concentrates by volume were obtained which contained 50% of the total interferon activity and only 2.6–2.7% of the total protein, i.e. a 19 fold increase of the specific activity.

Example 5

The acidification of KSCN-doucil-eluates or of other KSCN containing fluids can be done advantageously in two stages, minimising the risk of losing interferon by co-precipitation.

A pH 3.5 supernatant of 0.4 M KSCN doucil eluate was adjusted to pH 3.0, more protein was precipitated on standing at 4° which was again removed by spinning. Results are shown in Table V.

TABLE V

| | Interferon | | Protein | |
|---|---|---|---|---|
| | Titre | Percent | µg./ml. | Percent |
| pH 3.5 supernanant | 1/200 | 100 | 530 | 100 |
| pH 3.0 | 1/200 | 100 | 130 | 24 |

A further 4 fold purification without loss of activity was obtained in this way.

Example 6

It was found that interferon could be precipitated from KSCN-doucil-eluates (after pH 3.5 treatment, discarding of precipitated protein and neutralisation of the supernatant) with some water-miscible organic solvents (e.g. lower alcohols or ketones, like methanol, ethanol or acetone). Unlike other eluates of e.g. phosphate eluates, the addition of such solvents does not cause the simultaneous precipitation of the inorganic salt; the precipitates can therefore be re-dissolved and further fractionated directly on e.g. ion exchangers without the necessity of prior dialysis to lower the ionic concentration.

Precipitation with an organic solvent under the above mentioned conditions denatures further inactive protein. When the protein precipitate is taken up in e.g. Earle's buffer or in some other salt solution, the denatured protein does not redissolve and can be removed by e.g. spinning, thus giving rise to further purifications. Since the solvent-precipitated material can be re-dissolved in a volume substantially smaller than the pre-precipitation volume, additional concentration is also achieved. These points are shown in Table VI. In this experiment the doucil eluate after pH 3.5 treatment and removal of precipitated protein by spinning, was adjusted to pH 7.5 with NaOH. 5 volumes of methanol were added; after standing at 4° for 16 hours the precipitated protein was collected by spinning. The precipitate was suspended in a small volume of Earle's buffer and denatured protein discarded after short shaking.

TABLE VI

|  | Volume, ml. | Conc. factor | Interferon | | Protein | | Purif. factor |
| --- | --- | --- | --- | --- | --- | --- | --- |
|  |  |  | Titre | Percent | µg./ml. | Percent |  |
| Starting fluid | 1,000 | 1 | 40 | 100 | 1,370 | 100 | 1 |
| 0.4 M KSCN eluate from doucil | 200 | 5 | 200 | 100 | 1,960 | 29 | 3.5 |
| Supernatant after pH 3.5 treatment | 200 | 5 | 150 | 75 | 510 | 7.5 | 10.2 |
| Redissolved and clarified methanol precipitate | 10 | 100 | 3,200 | 80 | 860 | 0.63 | 128 |

In this experiment interferon was concentrated 100x by volume, the overall recovery of activity was 80%, the recovery of total protein was 0.63%, the specific activity was increased 128 times.

Example 7

A sample of partly purified chick interferon obtained by doucil adsorption, KSCN elution and pH 3.5. treatment (material A) was precipitated at pH 7.5 with 5 volumes of methanol. The resulting precipitate was taken up in a small volume of 0.01 M phosphate buffer of pH 7.5 and clarified. It was fractionated on a DEAE cellulose column of the same pH and molarity. The activity was not retained by the column, but a great proportion of the extraneous protein was. The fractions thus obtained had very high specific activities: The bulked active fractions contained about 40% of the total activity of "material A," but only 0.87% of its total protein. These bulked fractions were active at about 0.004 µg. protein/ml., whilst the crude allantoic fluid from which they had been derived was active at about 23 µg./ml.; the interferon had thus been purified about 6000 times. The bulked purified fractions contained some 250,000 interferon units per mg. protein, some of the individual fractions contained substantially more (1 interferon unit is here defined as the dilution which causes 50% inhibition of the cytopathic effect due to Semliki Forest virus on chick embryo fibroblast cell sheets).

Note.—The process described above is capable of producing substantially pure interferon in good yield by steps which could be readily operated on a manufacturing scale. No special equipment is needed, the material does not have to be dialysed at any stage.

Example 8

KSCN can also be employed in the purification of interferons other than chick interferon. In this experiment crude monkey interferon (produced by the action of the Kunz strain of influenza A virus on cyanomolgus monkey kidney cells) was treated with 4 mg./ml. doucil at pH 5 to adsorb the interferon. Elution was carried out with 0.5 M KSCN at pH 7.5 using ⅕ the volume of the original interferon. the pH of the eluate was adjusted to 3.5, the precipitated protein was removed by spinning. Results are in table VII.

TABLE VII

|  | Volume, ml. | Interferon | | Protein | |
| --- | --- | --- | --- | --- | --- |
|  |  | Titre | Percent | µg./ml. | Percent |
| Monkey interferon starting fluid | 110 | 1/40 | 100 | 190 | 100 |
| 0.5 M KSCN doucil eluate | 22 | 1/150 | 75 | 250 | 37 |
| pH 3.5 supernatant | 22 | 1/250 | 125 | 105 | 11 |

Monkey interferon was concentrated 5x by volume in good yield and purified at the same time about 10 fold.

I claim:

1. In a process for the purification of interferon in a crude aqueous solution of material containing it together with unwanted protein wherein a portion of said unwanted protein is precipitated and separated from said solution the step of precipitating said unwanted protein by contacting said material in said solution at a pH not greater than 5.0 with ions selected from the group consisting of iodide and thiocyanate introduced by the addition of a salt selected from the group consisting of an alkali metal iodide, ammonium iodide, an alkali metal thiocyanate and ammonium thiocyanate.

2. A process as claimed in claim 1 in which the pH of the solution during protein precipitation is above 2.0.

3. A process as claimed in claim 2 in which said pH is in the range 3.0 to 4.0.

4. A process as claimed in claim 1 in which the solution is from 0.1 M with respect to said ions.

5. A process as claimed in claim 4 in which the solution is at least 0.3 M with respect to said ions.

6. A process as claimed in claim 1 in which said ions are present in the crude aqueous solution containing interferon at a pH above 5.0, acid then being added to adjust the pH firstly to 3.5 to 4.0, followed by separation of insoluble protein, and then to 3.0–3.5 followed by further separation of protein.

7. A process as claimed in claim 1 in which interferon is adsorbed onto an adsorbent selected from the group consisting of an alumino-silicate adsorbent having a high ratio of silica to alumina and silica at a pH less than 6.0 and eluted therefrom with an aqueous solution containing ions selected from the group consisting of iodide and thiocyanate at a pH greater than 5.5 and no greater than 11, the pH of the eluate being subsequently adjusted to below 5.0 to precipitate unwanted protein.

8. A process as claimed in claim 7 in which the ratio of siilca to alumina in said aluminosilicate is greater than 5.

9. A process as claimed in claim 7 in which, after separation of unwanted protein, the interferon is precipitated from aqueous solution by addition of a water-miscible organic solvent selected from the group consisting of methanol, ethanol and acetone.

10. A process as claimed in claim 9 in which the pH of the aqueous solution during precipitation is in the range 6-9.

11. A process as claimed in claim 9 in which the precipitated interferon is re-dissolved in an aqueous medium.

12. A process as claimed in claim 11 in which the solution of re-dissolved interferon is contacted with an diethylaminoethyl cellulose.

13. A process as claimed in claim 12 in which the solution is passed through a column of said diethylaminoethyl cellulose.

References Cited

UNITED STATES PATENTS 3,265,581   8/1966   Fantes et al. _____ 167—78

OTHER REFERENCES

Aoki et al.: Archives of Biochemistry and Biophysics, vol. 97, pp. 75-79, 1962, 167-78 int.

Lampson et al.: Proceedings of Society for Experimental Biology and Medicine, vol. 112, no. 2, pp. 468-478, Feb., 1963, 167-78 int.

RICHARD L. HUFF, *Primary Examiner.*

LEWIS GOTTS, *Assistant Examiner.*